P. W. EVERHART.
COATING POT.
APPLICATION FILED MAY 6, 1913.

1,142,685.

Patented June 8, 1915.
2 SHEETS—SHEET 1.

Witnesses
Gerald Hennesy
C. C. Hines

Inventor
P. W. Everhart,
By Victor J. Evans
Attorney

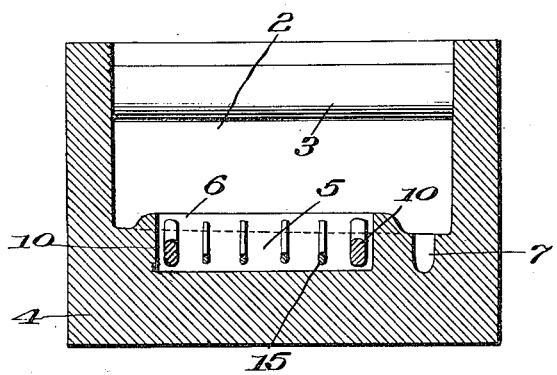
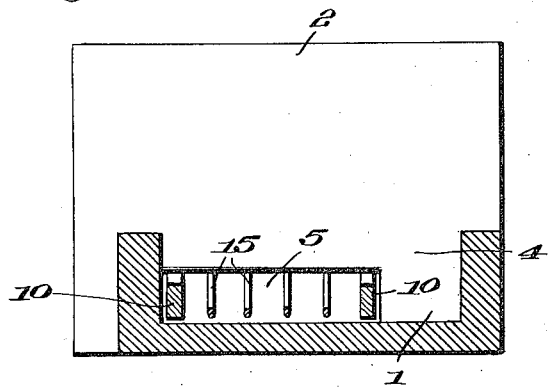
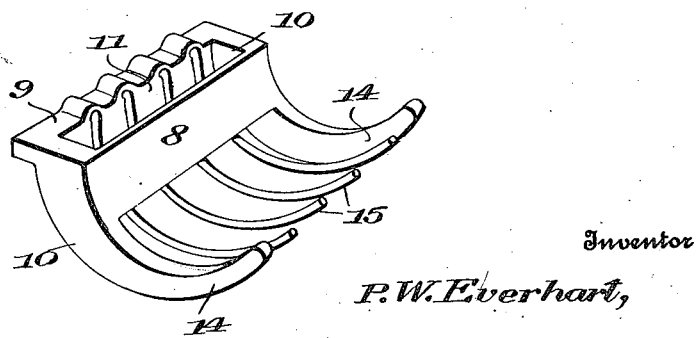

UNITED STATES PATENT OFFICE.

PERRY W. EVERHART, OF ELWOOD, INDIANA, ASSIGNOR OF ONE-HALF TO WALTER L. SIDERS, OF ELWOOD, INDIANA.

COATING-POT.

1,142,685.  Specification of Letters Patent.  Patented June 8, 1915.

Application filed May 6, 1913. Serial No. 765,888.

*To all whom it may concern:*

Be it known that I, PERRY W. EVERHART, a citizen of the United States, residing at Elwood, in the county of Madison and State of Indiana, have invented new and useful Improvements in Coating-Pots, of which the following is a specification.

This invention relates to a coating pot for use in the manufacture of tin plate, lead plate, galvanized plate, etc., the object of the invention being to provide a pot of this character which is simple, reliable and efficient in construction and operation and adapted to permit of the ready and free travel of the plate and to effect an even and regulated coating of the surfaces thereof.

A further object of the invention is to provide a coating pot which reduces the amount or volume of molten metal and oil required to be carried in the pot, which diminishes the amount of dross and amount of labor at the cleaner, and which provides for the free expansion and contraction of the metal and allows the temperature of the metal to be raised without affecting the oil, and vice versa.

With these and other objects in view, the invention consists of the features of construction, combination and arrangement of parts hereinafter fully described and claimed, reference being had to the accompanying drawings, in which,—

Figure 1:
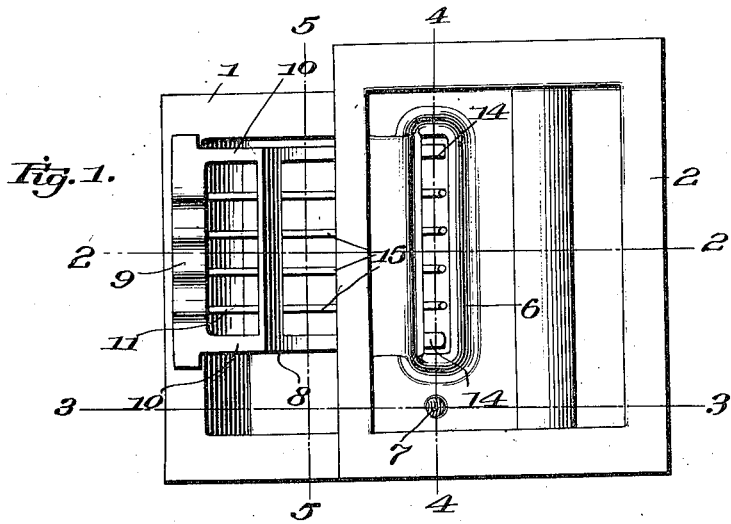
Figure 2:
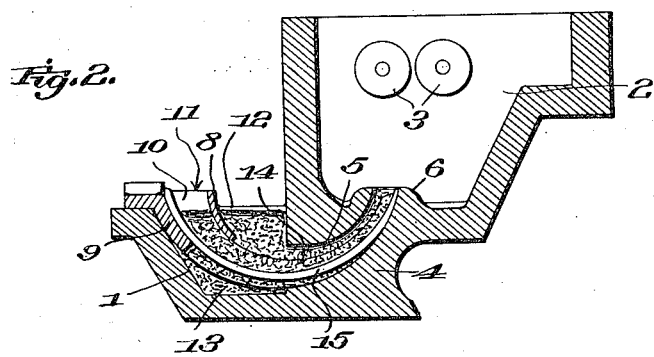
Figure 3:
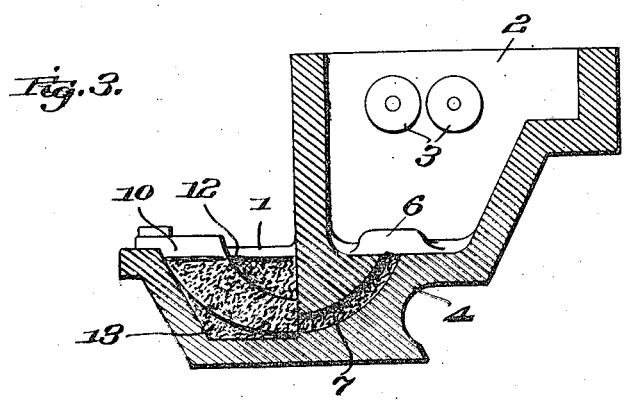

Figure 1 is a top plan view of a coating pot embodying my invention. Figs. 2 and 3 are vertical longitudinal sections on the lines 2—2 and 3—3 of Fig. 1. Figs. 4 and 5 are vertical transverse sections on the lines 4—4 and 5—5 of Fig. 1. Fig. 6 is a perspective view of the removable combined flux box and plate guide.

The device comprises a body or casting formed to provide a melting chamber 1 and an oil chamber 2, within which latter are arranged one or more pairs of coating rolls 3. The chamber 1 constitutes a trough-like compartment at the front of the body, and has its horizontal center arranged approximately in line with the bottom of the chamber 2, the bottom of the chamber 1 thus extending below the bottom of the chamber 2, which latter extends in stepped arrangement in rear of the rear wall of the chamber 1. The pot thus constructed is designed to be used in connection with a double heating furnace, so that the chambers may be independently heated to varying and dissimilar degrees of temperature, as occasion may require.

A comparatively thick wall or septum 4 connects the rear portion of the chamber 1 with the front portion of the chamber 2, and through this wall extends a slot or feed passage 5, communicating at its lower front portion with the melting chamber and at its upper rear portion with the rear chamber. As shown, said slot or passage extends upwardly and rearwardly on a curved line, so as to allow the sheets of metal feeding through the device to travel from the chamber 1 to the chamber 2 without excess bending or flexure. The walls of this slot or passage are smooth surfaced and coöperate with a guide device to secure free motion of the plate in its travel without liability of binding.

The bottom of the chamber 2 is provided with a guard rim or curbing 6 surrounding and defining the upper end of the feed passage, thus raising the upper end of the passage to a plane above the bottom of said chamber. The bottom, side and end walls of the chamber 2 slope toward said rim or curbing and also toward one end of the chamber, which is in communication with one end of the chamber 1 through a relief passage 7. This relief passage is adapted to allow the molten metal to rise and fall as it expands and contracts from temperature changes without material increase of its level in the chamber 1, thus diminishing liability of explosions.

By the provision of the rim or curbing 6 the amount of oil in contact with the metal is restricted to that which occupies the upper end of the feed passage and that which is in contact with the metal within the relief passage, thus obviating the necessity of employing large charges of metal and oil and at the same time allowing the temperature of the body of metal to be raised without affecting the temperature of the body of oil, and vice versa.

Disposed within the chamber 1 is a combined flux box and plate guide. This consists of a box or body formed of front, rear and end walls 8, 9 and 10, providing a guide inlet passage 11 through which the plate to be coated is introduced and which holds the charge of fluxing material 12 resting upon the surface of the metal 13. The inner surface of the front wall of the chamber 1 slopes downwardly and inwardly and the passage 11 is cross sectionally curved to conform thereto and rest thereagainst, and to guide the entered plate in a curved path on its feed to the slot or passage 5 through the body of molten metal. The end walls 10 of the flux box extend inwardly and upwardly in the form of curved arms 14, which project upwardly within the ends of the passage 5 and against the rear wall thereof. Between these arms extend a series of similarly curved parallel rods or wires forming guide fingers 15 which bear closely against the rear wall of the passage 5 and provide restricted contact surfaces to guide the plate being coated upwardly through the passage with a minimum degree of friction. By this means liability of the plate binding in its travel is avoided, and at the same time upon the removal of the flux box and guide the passage 5 may be easily and conveniently cleaned. The flux box and guide thus insures the proper feed of the sheet metal and its passage through the body of molten metal, and its curved arms and fingers provide a grid or grating which permits the molten metal to have free access to the feeding plate, as will be readily understood.

From the foregoing description, taken in connection with the drawings, the construction and mode of operation of my improved coating pot will be readily understood by those versed in the art, and it will be seen that, in addition to the advantages stated, the device provides for the use of minimum amounts of molten metal and oil, thus diminishing the amount of dross and liability of waste, while at the same time reducing the amount of labor at clean ups. Furthermore, by the construction of the pot so as to allow the metal and oil chambers to be independently heated, a more efficient mode of treatment is provided for.

I claim:—

1. A coating pot comprising a melting chamber and an oil chamber formed in a single casting, said chambers being arranged in stepped relation, with the lower front portion of the oil chamber integral with and arranged to overhang the upper rear portion of the melting chamber, whereby said chambers may be seated upon separate but juxtaposed heating furnaces, the connecting wall between said chambers being formed with a passage extending on a curved line from the rear portion of the base of the melting chamber upward through the bottom of the oil chamber, the latter having a raised portion or curb extending upwardly thereinto around the margin of the passage and through which said passage extends, the said chambers being also connected by a constricted relief passage, and a flux box disposed within the melting chamber and having curved guides extending upwardly through said passage.

2. A coating pot comprising melting and oil chambers disposed one in advance of and below the level of the other, said chambers being connected by a passage leading through the rear wall of the melting chamber on a curved line upwardly into and through the bottom wall of the oil chamber, coating rolls within the oil chamber, and a flux box disposed within the melting chamber, said box comprising an oblong rectangular body having its rear wall provided with a flange to rest upon the rim of the oil chamber and having its front wall depending to a greater degree than said rear wall, curved guide fingers extending from the rear wall downwardly and forwardly and through said passage between the chambers, and guards extending from the end walls of the flux box beyond the end fingers of the series and also extending into said passage.

In testimony whereof I affix my signature in presence of two witnesses.

PERRY W. EVERHART.

Witnesses:
WALTER L. SIDERS,
MINA SIDERS.